United States Patent
Rosenberg et al.

(10) Patent No.: US 7,971,228 B2
(45) Date of Patent: Jun. 28, 2011

(54) SYSTEM AND METHOD FOR PROVIDING APPLICATION-SPECIFIC ON-LINE CHARGING IN A COMMUNICATIONS ENVIRONMENT

(75) Inventors: Jonathan D. Rosenberg, Freehold, NJ (US); Flemming S. Andreasen, Marlboro, NJ (US); Mark Grayson, Maidenhead (GB)

(73) Assignee: Cisco Technology, Inc., San Jose, CA (US)

( * ) Notice: Subject to any disclaimer, the term of this patent is extended or adjusted under 35 U.S.C. 154(b) by 920 days.

(21) Appl. No.: 11/672,375

(22) Filed: Feb. 7, 2007

(65) Prior Publication Data
US 2008/0189760 A1 Aug. 7, 2008

(51) Int. Cl.
*H04L 9/00* (2006.01)
*H04L 9/32* (2006.01)
*G06F 7/04* (2006.01)

(52) U.S. Cl. ............ 726/1; 726/2; 726/3; 726/4; 726/5; 726/6; 713/168; 713/169; 713/170; 713/171; 713/172

(58) Field of Classification Search .................. 726/1
See application file for complete search history.

(56) References Cited

U.S. PATENT DOCUMENTS

| | | | |
|---|---|---|---|
| 5,602,907 A | 2/1997 | Hata et al. | 379/114 |
| 5,822,411 A | 10/1998 | Swale et al. | 379/111 |
| 5,828,737 A | 10/1998 | Sawyer | 379/114 |
| 5,905,736 A | 5/1999 | Ronen et al. | 370/546 |
| 5,909,238 A | 6/1999 | Nagashima et al. | 348/3 |
| 5,946,670 A | 8/1999 | Motohashi et al. | 705/400 |
| 5,956,391 A | 9/1999 | Melen et al. | 379/114 |
| 5,970,477 A | 10/1999 | Roden | 705/32 |
| 5,987,498 A | 11/1999 | Athing et al. | 709/203 |
| 6,016,509 A | 1/2000 | Dedrick | 709/224 |
| 6,035,281 A | 3/2000 | Crosskey et al. | 705/14 |
| 6,047,051 A | 4/2000 | Ginzboorg et al. | 379/130 |

(Continued)

FOREIGN PATENT DOCUMENTS
WO     WO 98/26381     12/1997

(Continued)

OTHER PUBLICATIONS

Online Inc., "Apogee Releases Content Usage-Based Billing Product Annotated Title—Software allows content usage-based billing," EContent, vol. 24, No. 5, NDN 173-0356-6509-7, 1 pg, Jul. 2001.

(Continued)

*Primary Examiner* — Longbit Chai
(74) *Attorney, Agent, or Firm* — Baker Botts L.L.P.

(57) ABSTRACT

An architecture for A method for providing on-line charging in a network environment is provided that includes interacting with an application that is selected by an end user, and with a policy enforcement point to install corresponding policies that are inclusive of charging rules. The method also includes performing, via a policy server, on-line charging interactions on behalf of the selected application itself such that application-specific on-line charging for the application is enabled. In more particular embodiments, the policy server understands which application is interacting with it by use of application tokens, source, or service identifiers. Also, the application element can query the policy server indirectly to grant network resources and the policy server examines an end user's policy profile or a network-wide profile (or both) and recognizes that on-line charging applies to the selected application.

21 Claims, 3 Drawing Sheets

U.S. PATENT DOCUMENTS

| | | | | |
|---|---|---|---|---|
| 6,070,192 | A | 5/2000 | Holt et al. | 709/227 |
| 6,075,854 | A | 6/2000 | Copley et al. | 379/211 |
| 6,131,024 | A | 10/2000 | Boltz | 455/405 |
| 6,141,684 | A | 10/2000 | McDonald et al. | 709/222 |
| 6,175,879 | B1 | 1/2001 | Shah et al. | 709/330 |
| 6,208,977 | B1 | 3/2001 | Hernandez et al. | 705/34 |
| 6,282,573 | B1 | 8/2001 | Darago et al. | 709/229 |
| 6,295,447 | B1 | 9/2001 | Reichelt et al. | 455/417 |
| 6,480,485 | B1 | 11/2002 | Kari et al. | 370/352 |
| 6,611,821 | B2 | 8/2003 | Stahl et al. | 705/400 |
| 6,665,537 | B1 | 12/2003 | Lioy | 455/435 |
| 6,671,675 | B2 | 12/2003 | Iwamura | 705/30 |
| 6,728,266 | B1 | 4/2004 | Sabry et al. | 370/468 |
| 6,757,371 | B2 | 6/2004 | Kim et al. | 379/114.22 |
| 2001/0023428 | A1 | 9/2001 | Miyazaki et al. | 709/201 |
| 2002/0059114 | A1 | 5/2002 | Cockrill et al. | 705/27 |
| 2002/0138601 | A1 | 9/2002 | Piponius et al. | 709/223 |
| 2003/0158816 | A1* | 8/2003 | Rouse | 705/51 |
| 2005/0191989 | A1* | 9/2005 | Plush et al. | 455/406 |
| 2005/0240988 | A1* | 10/2005 | Rajaniemi | 726/4 |
| 2008/0059635 | A1* | 3/2008 | Seiferth et al. | 709/226 |

FOREIGN PATENT DOCUMENTS

| | | |
|---|---|---|
| WO | WO 99/31610 | 12/1998 |

OTHER PUBLICATIONS

Centaur Communications, "Secret Bear platform allows paid-for SMS Annotated Title—Secret Bear introduced cross-network reverse billing platform allowing content providers to charge for SMS content," New Media Age, NDN 173-0354-6130-3, 1 pg, Jun. 28, 2001.

Karsten Luttge, "E-Charging API: Outsource Charging to a Payment Service Provider," NDN 174-0708-0924-8, pp. 216-227, 2001.

A. Herzberg, "Safeguarding Digital Library Contents: Charging for Online Content," D-Lib Magazine, NDN 174-0590-9051-8, 16 pgs, Jan. 1998.

Business Wire, "Apogee Networks Introduces Industry's First Content Usage-Based Billing Solution for Web Hosters," NDN 219-0281-6988-1, 2 pgs, May 8, 2001.

Business Wire, "Apogee Networks Announces Investment by Cisco Systems; Combined Efforts Enhance Billing Capabilities for Content Delivery Network Providers," NDN 219-0220-9035-0, 2 pgs, Jan. 23, 2001.

Business Wire, "Key Analysts Predict Content Billing is the Internet's New Frontier; Content is the Asset of the Industry; Apogee Networks Seen as the Leader in New Internet Industry Space," NDN 219-0162-6934-6, 3 pgs, Oct. 10, 2000.

Business Wire, "Apogee Networks Unveils NetCountant Wireless Billing At SUPPERCOMM; Company Demonstrates Industry First Wireless Content Usage Based Billing Solution," NDN 218-0324-8075-6, 2 pgs, Jun. 5, 2001.

Business Wire, "Apogee Networks Wins 2000 Communications ASP Product of the Year Award; Apogee Networks' NetCountant Billing Takes Top Honors for Innovative Content Usage Based Billing Solutions," NDN 218-0282-3757-7, 2 pgs, Mar. 21, 2001.

Business Wire, "Wireless Internet Content Billing and Settlement Capability Announced; Companies Announce Interoperability Between WAP Gateway and Content Billing System," NDN 218-0220-0997-2, 2 pgs, Dec. 6, 2000.

Business Wire, "Apogee Networks Joins Content Alliance; Billing Expert to Join industry Group Aimed At Advancing Content Networking," NDN 218-0181-2716-7, 3 pgs, Oct. 11, 2000.

Business Wire, "Apogee Networks, Inc. and Paysys International, Inc. to Integrate Technologies to Create Advanced IP Content Billing Solutions," NDN 218-0098-0623-9, 3 pgs, Jun. 19, 2000.

* cited by examiner

SYSTEM AND METHOD FOR PROVIDING APPLICATION-SPECIFIC ON-LINE CHARGING IN A COMMUNICATIONS ENVIRONMENT

TECHNICAL FIELD OF THE INVENTION

This invention relates in general to the field of communications and, more particularly, to a system and a method for providing application-specific on-line charging in a communications environment.

BACKGROUND OF THE INVENTION

Networking architectures have grown increasingly complex in communications environments. In addition, the augmentation of clients or end users wishing to communicate in a network environment has caused many networking configurations and systems to respond by adding elements to accommodate the increase in networking traffic. Communication tunnels or links may be used in order to establish or to gain access to a network, whereby an end user or an object may initiate a tunneling protocol by invoking a selected location or a network node. The network node or central location may then provide a platform that the end user may use to conduct a communication session.

As the subscriber base of end users increases, proper routing and efficient management of communication sessions and data flows becomes even more critical. Having access to, or being aware of, accurate network node activity is important for executing proper routing techniques and for billing/charging purposes. In cases where improper routing protocols are executed, certain network components are not being optimized and the experience for any group of end users can suffer. Designing an effective application configuration and an optimal application invocation procedure provides a significant challenge to component manufacturers, system administrators, and network operators.

SUMMARY OF THE INVENTION

From the foregoing, it may be appreciated by those skilled in the art that a need has arisen for an improved communications approach that provides for an optimal application configuration and accurate charging for one or more end users. In accordance with one embodiment of the present invention, a system and a method for providing application-specific on-line charging in a communications environment are provided that greatly reduce disadvantages and problems associated with conventional network routing techniques.

According to one embodiment of the present invention, an architecture for providing on-line charging in a network environment is provided that includes interacting with an application that is selected by an end user, and with a policy enforcement point to install corresponding policies that are inclusive of charging rules. The method also includes performing, via a policy server, on-line charging interactions on behalf of the selected application itself such that application-specific on-line charging for the application is enabled.

In more particular embodiments, the policy server understands which application is interacting with it by use of application tokens or service identifiers. Also, the application element can query the policy server indirectly to grant network resources and the policy server examines an end user's policy profile or a network-wide profile and recognizes that on-line charging applies to the selected application. In still other embodiments, the policy server interacts with an on-line charging system to perform application-specific on-line charging. When application usage stops, the policy server recognizes this condition through interaction with the application element such that it can inform the on-line charging system. Additionally, if the end user runs out of credits, the policy server recognizes this condition and informs the application element that network resources are no longer available and, further, instructs the application to terminate.

In more particular embodiments, configuration of per-subscriber application level authorization can be statically configured on the application element. The application element can signal to a policy server that resource reservation and commit requests have been authorized at an application level.

Some embodiments of the present invention may provide a number of technical advantages. For example, according to one embodiment of the present invention, a communications approach is provided that supports application requests and, further, augments system performance and enhances the end user's network experience. This is due to the enablement of application-specific online charging without any explicit on-line charging support in the application itself. Such a solution can be achieved by having the policy server interact with the on-line charging system and install the necessary charging rules. The system can accommodate application-specific on-line charging for any kind of application that interacts with a policy server without requiring the application itself to support on-line charging.

Certain embodiments of the present invention may enjoy some, all, or none of these advantages. Other technical advantages may be readily apparent to one skilled in the art from the following figure, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS OF THE INVENTION

Figure 1:
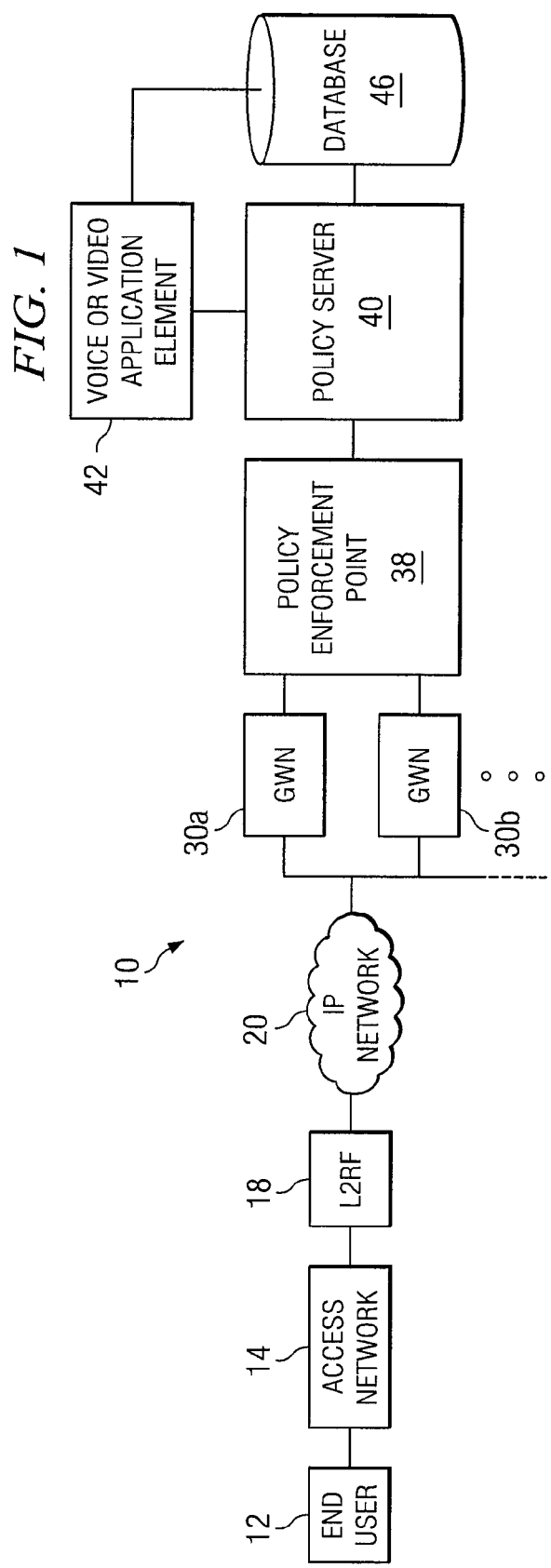
FIG. 1 is a simplified block diagram of a communications system for providing application-specific on-line charging in a communications environment in accordance with one embodiment of the present invention.

FIG. 1 is a simplified block diagram of a communications system 10 for communicating data in a network environment and, further, for providing application-specific on-line charging. Communications system 10 includes an end user 12, an access network (AN) 14, a layer 2-relay function (L2RF) 18, and internet protocol (IP) network 20. Additionally, communications system 10 may include multiple gateway nodes (GWNs) 30a-b. Communications system 10 may also include a policy enforcement point (PEP) 38, a policy server 40, which is coupled to a voice or video application element 42 and a database 46, which also has connectivity to voice or video application element 42. Although discussed in terms of mobile networks, there is nothing that would disallow the present invention to apply to other networks. It should be noted that although focused on mobile networks, there is nothing to disallow the invention to apply to other networks.

FIG. 1, in this mobile network example, may be generally configured or arranged to represent a communication architecture, e.g., a 2.5G network applicable to a Global System for Mobile (GSM) environment in accordance with a particular embodiment of the present invention. However, the 2.5G architecture is offered for purposes of example only and may alternatively be substituted with any suitable networking protocol or arrangement that provides a communicative platform for communications system 10. For example, communications system 10 may cooperate with any version of a GPRS tunneling protocol (GTP) that includes application operations. This may be inclusive of first generation, 2G, and 3G architectures that provide features for application distribution. In another example, communications system 10 may cooperate with the Point-to-Point Protocol (PPP) that supports xDSL architectures providing features for application distribution.

In accordance with the teachings of the present invention, communications system 10 can enable application-specific online charging, without any explicit on-line charging support in the application itself, by having the policy server: 1) interact with the on-line charging system; and 2) install the necessary charging rules in the PEP. Policy server 40 knows about the application in question by use of existing mechanisms that either pass an application identifier (in the form of a token, service identifier, etc.) from the application to the policy server, or by configuration in the policy server (e.g. based on source). Such a concept enables application-specific on-line charging for any kind of application that interacts with a policy server, without requiring the application itself to support on-line charging.

Note that for purposes of teaching and discussion, it is useful to provide some overview as to the way in which the following invention operates. The following foundational information may be viewed as a basis from which the present invention may be properly explained. Such information is offered earnestly for purposes of explanation only and, accordingly, should not be construed in any way to limit the broad scope of the present invention and its potential applications.

On-line charging involves a user obtaining a particular service with rating and credit control for the service performed in real-time. The user has a certain number of credits with the system, and his use of service uses those credits. When there are no more credits left, service ceases until more credits are added. On-line charging applies to two different domains: 1) the network layer, where charging is done based on network resources used (e.g. bytes sent/received, time, etc.); and 2) the application layer, where charging can be done based on any number of application-specific events (e.g. call start/stop, message sent/received, etc.). By combining on-line charging for the two domains, application-specific on-line charging of network resources can be performed.

This charging operation can be done in one of two ways. In the first scenario, when a user obtains IP-access, static charging rules are installed in the edge router (which is the policy enforcement point), and based on UDP/TCP ports, deep packet inspection, etc. application-specific on-line charging is enabled. In the second scenario, a particular application interacts with the edge router, possibly via a policy server, and dynamically installs on-line charging rules for network resources used by that application. The application also implements the necessary on-line application charging logic and interacts with a credit-control system to implement the actual on-line charging.

As can be seen from the above activity, application-specific on-line charging is either confined to statically installed rules, or dynamically installed on-line charging that requires explicit application support (and, hence, development and deployment). A generic approach that can provide on-line charging support for applications that do not support it themselves would be desirable.

In accordance with the architecture of communications system 10, a protocol is defined that optimizes performance in the following manner. In order to obtain network resources, the application interacts with the policy server, which in turn interacts with the PEP to install the necessary policies (including charging rules). Key to this protocol is the policy server recognizing which application is interacting with it [e.g. by use of application tokens or service identifiers].

The present invention enables application-specific on-line charging for any application interacting with it by having the policy server perform the on-line charging interactions on behalf of the application itself.

If the user runs out of credits, the policy server recognizes this condition and can, in turn, inform the application (either directly or indirectly) that network resources are no longer available, and/or directly instruct the application to terminate and/or instruct the application to redirect the user to a top up service (e.g., via an IVR for SIP based voice service or web portal for a browsing service), and/or to place administrative restrictions on the service delivered by the applications (e.g., restricting the sites to which a browser may connect). Additional details relating to these operations are provided below with reference to FIGS. 2 and 3.

Turning now to the infrastructure of FIG. 1, end user 12 is a client or a customer wishing to initiate a communication in communications system 10 via IP network 20. End user 12 may be inclusive of devices used to initiate a communication, such as a computer, a personal digital assistant (PDA), a laptop or an electronic notebook, a telephone, a mobile station, or any other device, component, element, or object capable of initiating voice or data exchanges within communications system 10. End user 12 may also be inclusive of a suitable interface to the human user, such as a microphone, a display, a keyboard, or other terminal equipment (such as for example an interface to a personal computer or to a facsimile machine in cases where end user 12 is used as a modem). End user 12 may also be any device that seeks to initiate a communication on behalf of another entity or element, such as a program, a database, or any other component, device, element, or object capable of initiating a voice or a data exchange within communications system 10. Data, as used herein in this document, refers to any type of numeric, voice, video, audio-visual, or script data, or any type of source or object code, or any other suitable information in any appropriate format that may be communicated from one point to another.

AN 14 is a communications interface between end user 12 and L2RF 18. In the case of a GSM system, AN 14 may comprise a base transceiver station and a base station controller. The communications interface provided by access network 14 offers connectivity and allows data to be exchanged between end user 12 and any number of selected elements within communications system 10. Access network 14 facilitates the delivery of a request packet generated by end user 12 and the reception of information sought by end user 12. Access network 14 is only one example of a communications interface between end user 12 and L2RF 18. Other types of communications interfaces may be used for a desired network design based on particular needs (e.g. SGSN/GGSN configurations).

IP network 20 represents a series of points or nodes of interconnected communication paths for receiving and transmitting packets of information that propagate through communications system 10. IP network 20 offers a communicative interface between end user 12 and selected GWNs 30a-b and may be any local area network (LAN), wireless local area network (WLAN), metropolitan area network (MAN), wide area network (WAN), virtual private network (VPN), or any other appropriate architecture or system that facilitates communications in a network environment. IP network 20 implements a user datagram protocol (UDP)/internet protocol (UDP/IP) communication language protocol in a particular embodiment of the present invention. However, IP network 20 may alternatively implement any other suitable communication protocol for transmitting and receiving data or information within communications system 10.

L2RF 18 and GWNs 30a-b are network elements that cooperate in order to facilitate a communication session involving end user 12. GWNs 30a-b are communications or network nodes that may be working in conjunction with multiple L2RFs 18 to provide a communications medium in a GPRS service network environment in communicating data exchanges within communications system 10. GPRS represents a packet-based data bearer service for communication services that may be delivered as a network overlay for any type of suitable network configuration or platform. GPRS generally applies packet-radio and packet switching principles to transfer data packets in an efficient way between GSM elements or units and external packet data networks. GPRS may support multiple internet communication protocols and may enable existing IP, X.25, or any other suitable applications or platforms to operate over GSM connections.

PEP 38 is an edge router in one embodiment, but this element may be replaced with software, a gateway, a switch, a bridge, or any other element that provides a policy enforcement point for the architecture.

In certain situations, an application function (e.g. voice or video application element 42), which can signal to policy server 40 to commit and/or reserve resources on behalf of a user, will include in a given request an explicit indication of whether such resources have been authorized at the application level. Authorization at the application level may entail application level user authentication (for example SIP Digest: AKA authentication in an IMS environment) and may entail the recovery of per-user application level authorization information (e.g., recovery of a maximum per subscriber allowed SDP from a home subscriber server (HSS) [which is not shown explicitly, but which could be incorporated into several of the components of FIG. 1 or provided separately] to a S-CSCF in an IMS environment over the Cx interface, or the recovery of an application specific authorization over the Sh interface).

An application function may be pre-configured with static information concerning whether all resource requests have been authorized or per-subscriber authorization information may be passed in-band using signaling between the S-CSCF and the P-CSCF. When the application function requests resources to be reserved or committed for a particular user flow, it can include information as to whether this request corresponds to an authorized application.

When policy server 40 receives an application resource reservation/commit request, it can analyze the authorization information. If application level authorization is not indicated, then the policy server can use the per-subscriber bearer level policy to optionally down-negotiate the requested application level requests. If the application level authorization is indicated, then policy server 40 may ignore the per-subscriber bearer level policy information.

In one embodiment, policy server 40 and voice or video application element 42 are servers or processors that can interact in order to achieve the on-line charging features, as described herein. It should also be noted that the internal structure of these components is malleable and can be readily changed, modified, rearranged, or reconfigured in order to achieve their intended operations as they pertain to the functions described herein. In other embodiments, either policy server 40 or voice or video application element 42 is any suitable component (e.g. a gateway, a switch, a router, a bridge, a state machine, etc.) that is operable to interface with end user 12, endpoints/end-user devices, etc.

Software and/or hardware may reside in policy server 40 and/or voice or video application element 42 in order to achieve the teachings of the on-line charging features of the present invention. However, due to their flexibility, these components may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of policy server 40 and voice or video application element 42 in the context of communications system 10 and, accordingly, they should be construed as such.

It should be noted that the internal structure of the system of FIG. 1 is versatile and can be readily changed, modified, rearranged, or reconfigured in order to achieve its intended operations or additional operations. Additionally, any of the items within FIG. 1 may be combined, where appropriate, or replaced with other functional elements that are operable to achieve any of the operations described herein.

Figure 2:
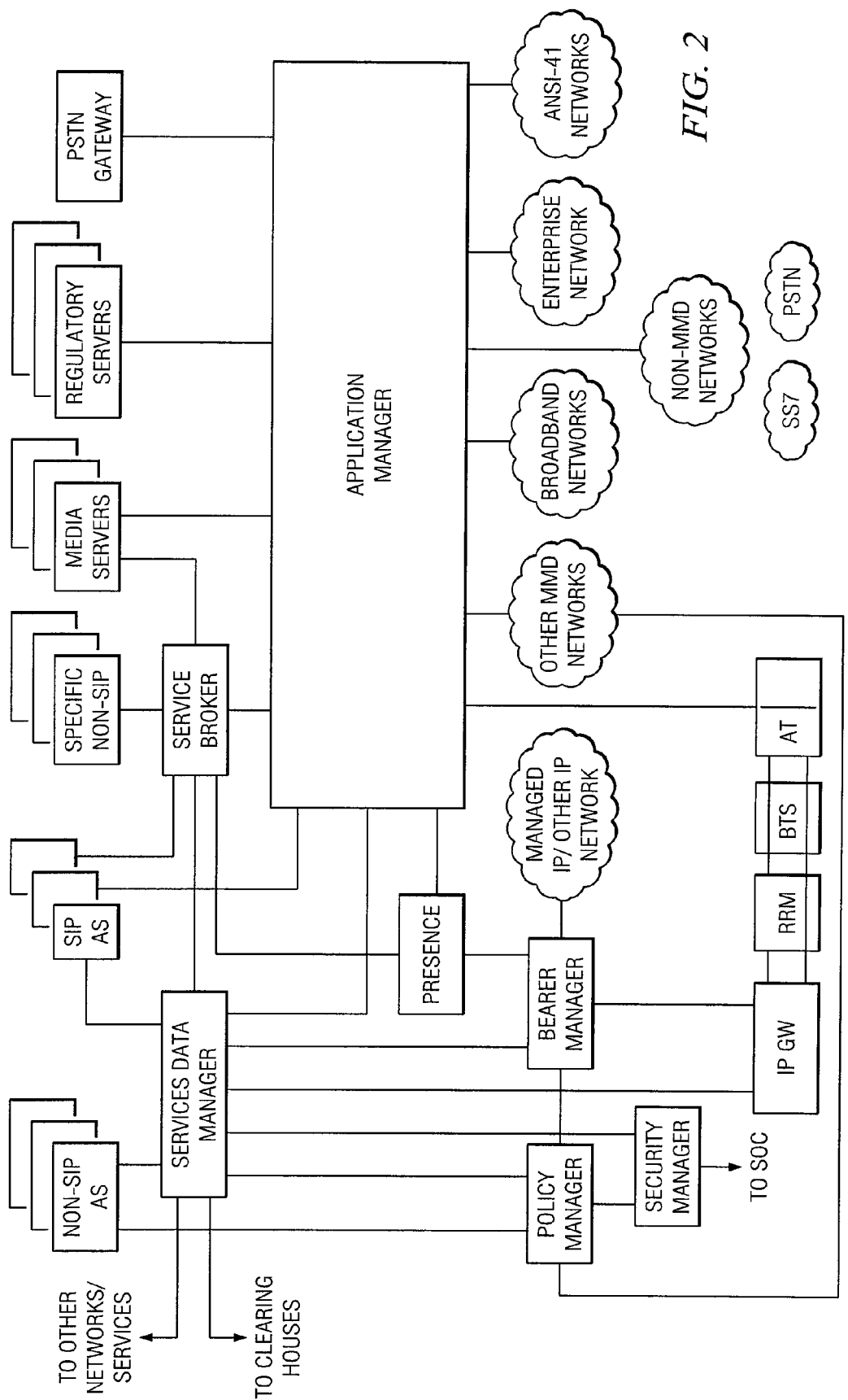
FIG. 2 is a simplified block diagram illustrating a more comprehensive example implementation of one potential embodiment of the present invention.

Before proceeding to the example architecture of FIG. 2, some preliminary information is offered in an attempt to better guide and enlighten the audience. The identification of specific protocols or signaling is not limiting, as it is only offered in earnest to teach or better explain some (but not all) of the applications of the present invention. Policy Server 40 can include per user bearer authorization but, as highlighted above, will not be able to intelligently decide whether the request is from an authorized application or an off-net service. Communications system 10 allows the policy decision not just be based on bandwidth requested by the user, but also based on an indication that this bandwidth is associated with an authorized application. This, in turn, allows an operator to admit the request for 4 Mb/s service when it is associated with an authorized application, but deny it when it is not associated with an application.

The role of the policy server in IP-NGN (next generation network) is critical in its ability to offer differentiated packet handling and charging of service data flows passing through an access gateway. The typical policy server has an interface to a policy repository, which contains bearer specific policy rules for an individual subscriber, e.g., gold/silver/bronze classifications, which can then be mapped to peak and/or mean bandwidths available to a particular user.

Such a policy server relegates the access provider to a pipe (albeit that the size of the pipe can be varied between users). IP NGN is about more than pipes and, importantly, is about how to couple applications to the IP fabric to enable the access gateway to differentially handle service data flows, not simple aggregates.

The definition of a service data flow is originated at an application function. This will typically define a 5 tuple or even perhaps a content rule for an application specific service data flow. Following standard NGN architectures, this information will be passed from application function to policy server (e.g., using the 3GPP Rx interface). The policy server will then consult the policy repository (e.g., using the 3GPP SP interface) before configuring the access gateway to support the service data flow with the required quality of service and charging handling (e.g., using the 3GPP Gx interface).

FIG. 2 is a simplified block diagram illustrating additional details associated with an example A-IMS architecture and, further, offers a simple flow according to the teachings of one embodiment of the invention. FIG. 2 depicts another example environment in which the present invention can operate. This FIGURE is slightly more comprehensive and, accordingly, includes a number of components that are not necessarily required to implement the present invention. In this scenario, the bearer manager is commensurate with the network configuration of FIG. 1.

The service broker supports complex feature interactions, feature interaction between SIP and non-SIP applications, and changes to an application manager feature and service logic communicated via application behavior modifiers (ABMs). The serving application manager supports invocation of service brokers and SIP application servers during session setup and mid-session (as a result of policy updates), enhanced initial filter criteria (IFC) capabilities for more efficient SIP application server and service broker invocation, and increased programmable service logic in the application manager. In addition, the serving application manager can act on application behavior modifiers.

The policy manager (PM) (i.e. policy server 20) can reside in both the home and visited network. The home PM can receive application descriptors from the application manager (or more generically application element 42) and Non-SIP ASes, identifying an application (whether SIP-based or not, as it is important to understand that this applies to any kind of application (SIP and non-SIP) that interfaces with the PM) and its media components. The PM can modify the application behavior by sending an application behavior modifier (ABM) to the application. The edge application manager in home network interacts with home policy manager. The access terminal (AT) can support SIP and non-SIP applications, whereby interaction can be guided by a policy document supplied to the AT.

There are a number of service interaction problems addressed by A-IMS. These include service interaction between SIP and non-SIP applications, conditional application invocation based on external context information, and policy decisions impacting application behavior. Other policy enhancements in A-IMS may include policy controls that go beyond QoS and charging. These may be inclusive of: mobility [whether handoffs are allowed, whether roaming to an operator is permitted], ACL [black/white lists based on 5-tuple to limit service], and DPI [which applications to search for or verify].

In regards to policy delegation, the policy server 20 can delegate enforcement to lower layer elements, which allows rules to be pushed to the edge. Additionally, enhancements to the application element/policy server interface for SIP and non-SIP applications can include: richer classifiers and QoS definitions (for example VBR), along with richer description of the application (for example, "audio" and "video" and "PTT" and "interactive") for better home-based policy controls. The PCRF can dictate that the AF do things other than simply tearing down calls (for example drop to a lower codec). Also, with respect to policy peering, there is a capabilities exchange on the policy server processing. The ability to refuse and to negotiate policies is also provided. Also, authentication and security would be appropriate for inter-operator interfaces.

Figure 3:
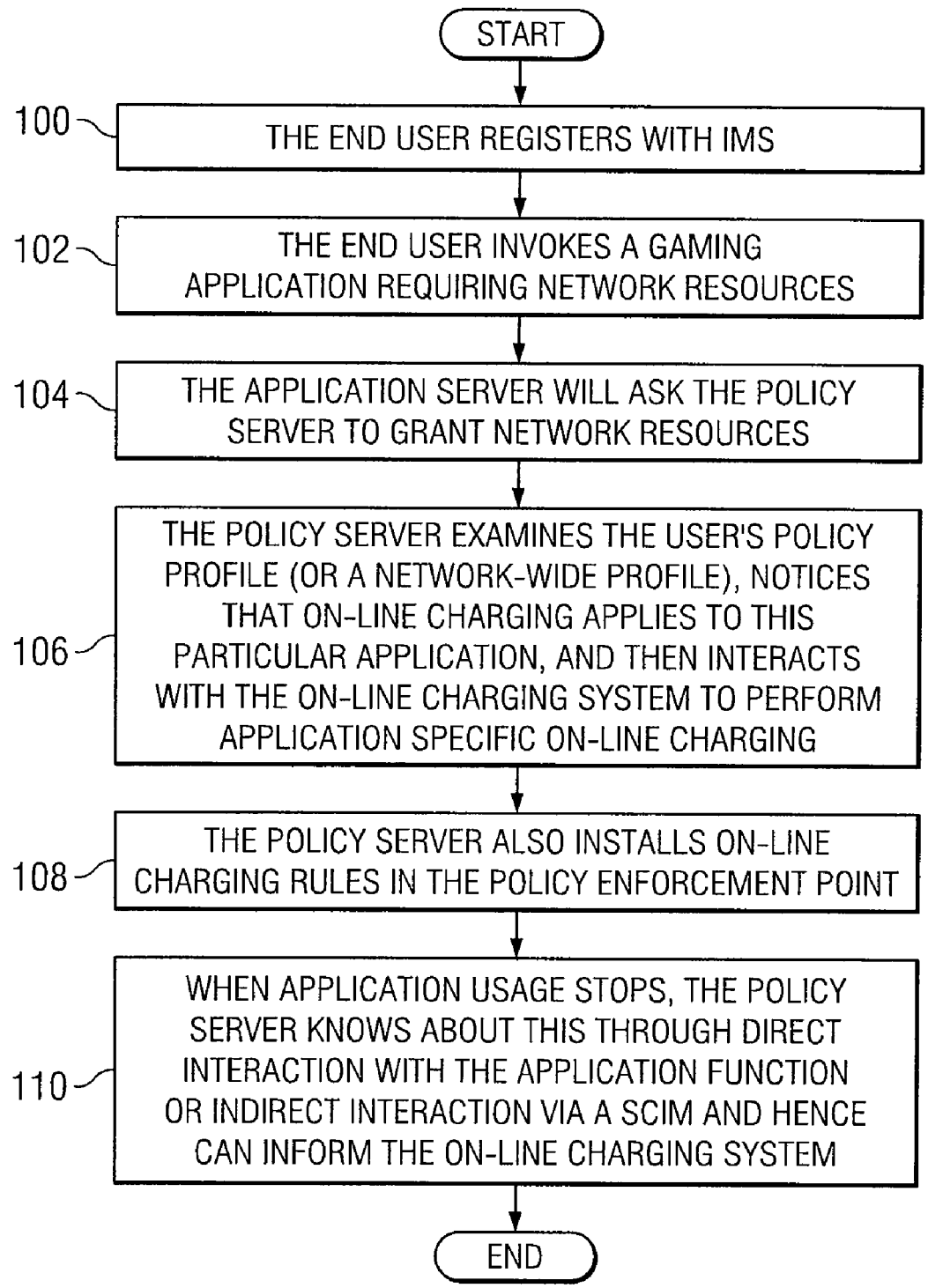
FIG. 3 is a simplified flowchart illustrating certain details associated with an example architecture and, further, offers a simple flow according to the teachings of one embodiment of the invention.

FIG. 3 is a simplified flowchart that addresses an IMS service example, which is a SIP-based application in this scenario. First, the user registers with IMS, as is conventionally done; this is illustrated in step 100. This would involve use of an encrypted packet. For example, if a user invokes a gaming application [shown as step 102] requiring network resources, the application server will ask the policy server to grant network resources at step 104. Note that in this example, the application is not SIP-based and hence interacts directly with the policy server.

At that time, the policy server examines the user's policy profile (or a network-wide profile), notices that on-line charging applies to this particular application, and then interacts with the on-line charging system (e.g. using the Diameter Credit Control Application) to perform application-specific on-line charging at step 106. It also installs on-line charging rules in the policy enforcement point at step 108.

When application usage stops, the policy server knows about this through direct interaction with the application function, or through indirect interaction via a SCIM and, hence, can inform the on-line charging system (and return any unused credits). This is reflected by step 110. Similarly, if the user runs out of credits, the policy server will know about this and can in turn inform the application (either directly or indirectly) that network resources are no longer available. The policy server can instruct the application to terminate, and/or instruct the application to redirect the user to a top up service (e.g., via an IVR for SIP based voice service or web portal for a browsing service), and/or place administrative restrictions on the service delivered by the applications (e.g., restricting the sites to which a browser may connect).

Some of the steps discussed with reference to FIG. 3 may be changed or deleted where appropriate and additional steps may also be added process flows. These changes may be based on specific communication architectures or particular interfacing arrangements and configurations of associated elements and do not depart from the scope or the teachings of the present invention.

Although the present invention has been described in detail with reference to particular embodiments, communications system 10 may be extended to any scenario in which end user 12 is provided with application options in the context of a wired or a wireless connection or coupling. This may also be extended to any other network architectures and include communications with any type of access server (e.g. a network access server (NAS), foreign agents, etc.). End user 12 may use a dedicated connection of some form or use forms of multiple access protocols where appropriate. Access may be associated with a point-to-point protocol (PPP) architecture or alternatively with layer three protocols over a layer two protocol in accordance with particular needs.

Moreover, significant flexibility is provided by communications system 10 in that any suitable one or more components may be replaced with other components that facilitate their operations. For example, access network 14 and L2RF 18 may be replaced by an access network or by a packet data-serving node (PDSN). GWNs 30*a* and 30*b* may be replaced by a home agent or a NAS where appropriate, as identified above.

Additionally, although described in specific environments and contexts, the present invention could be used in countless applications, such as in edge proxies or other application functions. The present invention could also be used in conjunction with GWNs if (or when) a policy server collapses onto gateway element. Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. An apparatus comprising:
a policy server, configured with at least one processor, operable to:
identify an application selected by an end user;
install one or more charging rules on a policy enforcement point upon communicating with an on-line charging system;
analyze authorization information of a network resource reservation request from the application and in response to an indication that one or more requested network resources have been authorized for the application;
reserve the one or more requested network resources on behalf of the end user based on the indication that the one or more requested network resources have been authorized for the application; and
perform on-line charging on behalf of the application by charging the end user according to the charging rules based on usage of the one or more requested network resources and on one or more application-specific events.

2. The apparatus of claim 1, the policy server operable to identify the application selected by the end user using one or more application tokens, or a source, or one or more service identifiers.

3. The apparatus of claim 1, the policy server operable to:
determine from a policy profile that the on-line charging applies to the application.

4. The apparatus of claim 1, the policy server operable to:
determine that the end user has no more credits; and
inform the application that the one or more network resources are no longer available.

5. The apparatus of claim 1, the policy server operable to:
determine that the end user has no more credits; and
instruct the application to terminate.

6. The apparatus of claim 1, the policy server operable to:
determine that the end user has no more credits; and
instruct the application to redirect the end user to a top up service.

7. The apparatus of claim 1, the policy server operable to:
determine that the end user has no more credits; and
place an administrative restriction on a service delivered by the application.

8. A method comprising:
identifying, by a policy server configured with at least one processor, an application selected by an end user;
installing, by the policy server, one or more charging rules on a policy enforcement point upon communicating with an on-line charging system;
analyzing authorization information of a network resource reservation request from the application and in response to an indication that one or more requested network resources have been authorized for the application;
reserving, by the policy server, the one or more requested network resources on behalf of the end user based on the indication that the one or more requested network resources have been authorized for the application; and
performing, by the policy server, on-line charging on behalf of the application by charging the end user according to the charging rules based on usage of the one or more network resources and on one or more requested application-specific events.

9. The method of claim 8, the identifying the application selected by the end user comprising identifying the application using one or more application tokens, or a source, or one or more service identifiers.

10. The method of claim 8, further comprising:
determining from a policy profile that the on-line charging applies to the application.

11. The method of claim 8, further comprising:
determining that the end user has no more credits; and
informing the application that the one or more network resources are no longer available.

12. The method of claim 8, further comprising:
determining that the end user has no more credits; and
instructing the application to terminate.

13. The method of claim 8, further comprising:
determining that the end user has no more credits; and
instructing the application to redirect the end user to a top up service.

14. The method of claim 8, the further comprising:
determining that the end user has no more credits; and
placing an administrative restriction on a service delivered by the application.

15. A computer software product embodied in one or more non-transitory computer-readable storage media having program code that when executed by one or more processors is operable to:
identify, by a policy server, an application selected by an end user;
install, by the policy server, one or more charging rules on a policy enforcement point upon communicating with an on-line charging system;
analyze authorization information of a network resource reservation request from the application and in response to an indication that one or more requested network resources have been authorized for the application;
reserve, by the policy server, the one or more requested network resources on behalf of the end user based on the indication that the one or more requested network resources have been authorized for the application; and
perform, by the policy server, on-line charging on behalf of the application by charging the end user according to the charging rules based on usage of the one or more requested network resources and on one or more application-specific events.

16. The computer software product of claim 15, the code operable to identify the application selected by the end user using one or more application tokens, or a source, or one or more service identifiers.

17. The computer software product of claim 15, the code operable to:
determine from a policy profile that the on-line charging applies to the application.

18. The computer software product of claim 15, the code operable to:
determine that the end user has no more credits; and
inform the application that the one or more network resources are no longer available.

19. The computer software product of claim 15, the code operable to:

determine that the end user has no more credits; and instruct the application to terminate.

20. The computer software product of claim 15, the code operable to:

determine that the end user has no more credits; and instruct the application to redirect the end user to a top up service.

21. The computer software product of claim 15, the code operable to:

determine that the end user has no more credits; and place an administrative restriction on a service delivered by the application.

\* \* \* \* \*